United States Patent
Laugen et al.

(10) Patent No.: US 10,813,288 B2
(45) Date of Patent: Oct. 27, 2020

(54) AUTOMATED BELT SPEED CONTROL

(71) Applicant: Deere & Company, Moline, IL (US)

(72) Inventors: Austin M. Laugen, Davenport, IA (US); Benjamin M. Lovett, Colona, IL (US); Bryan R. Yanke, Eldridge, IA (US); Duane M. Bomleny, Geneseo, IL (US)

(73) Assignee: Deere & Company, Moline, IL (US)

( * ) Notice: Subject to any disclaimer, the term of this patent is extended or adjusted under 35 U.S.C. 154(b) by 302 days.

(21) Appl. No.: 15/994,588

(22) Filed: May 31, 2018

(65) Prior Publication Data
US 2019/0364733 A1 Dec. 5, 2019

(51) Int. Cl.
| A01D 41/12 | (2006.01) |
| A01D 41/127 | (2006.01) |
| A01D 41/14 | (2006.01) |
| A01D 57/20 | (2006.01) |

(52) U.S. Cl.
CPC ....... *A01D 41/1274* (2013.01); *A01D 41/142* (2013.01); *A01D 57/20* (2013.01)

(58) Field of Classification Search
CPC ................................................ A01D 41/1274
See application file for complete search history.

(56) References Cited

U.S. PATENT DOCUMENTS

| 8,527,157 | B2* | 9/2013 | Imhof | A01D 57/20 701/50 |
| 9,265,199 | B2 | 2/2016 | Ritter et al. | |
| 2008/0276590 | A1* | 11/2008 | Sauerwein | A01D 41/14 56/153 |
| 2011/0056178 | A1* | 3/2011 | Sauerwein | A01D 41/142 56/181 |
| 2011/0270494 | A1* | 11/2011 | Imhof | A01D 57/20 701/50 |
| 2011/0270495 | A1* | 11/2011 | Knapp | A01D 41/1243 701/50 |
| 2014/0047810 | A1 | 2/2014 | Peters et al. | |
| 2016/0073583 | A1* | 3/2016 | Reich | G01B 7/14 702/41 |

(Continued)

FOREIGN PATENT DOCUMENTS

| DE | 102008043716 A1 | 5/2010 | |
| EP | 2382854 A1 * | 11/2011 | ........... A01D 41/142 |

(Continued)

OTHER PUBLICATIONS

European Search Report issued in counterpart European Patent Application No. 19176908.2 dated Oct. 28, 2019 (7 pages).

*Primary Examiner* — Alex C Dunn
(74) *Attorney, Agent, or Firm* — Joseph R. Kelly; Kelly, Holt & Christenson, PLLC

(57) ABSTRACT

An agricultural harvesting machine includes a header, a feederhouse and a draper belt configured to transport agricultural material to the feederhouse of the agricultural harvesting machine. The agricultural harvesting machine also includes a motor configured to drive the draper belt and a draper belt control system configured to determine a distribution of crop across the header of the agricultural harvesting machine and, based on the distribution of crop, generate a control signal for the motor to modify an operating characteristic of the draper belt.

20 Claims, 6 Drawing Sheets

(56) References Cited

U.S. PATENT DOCUMENTS

| | | | |
|---|---|---|---|
| 2017/0086367 A1* | 3/2017 | Enns | A01D 34/38 |
| 2017/0115862 A1* | 4/2017 | Stratton | A01D 41/1271 |
| 2017/0318743 A1* | 11/2017 | Sauder | A01C 7/102 |
| 2018/0054964 A1 | 3/2018 | Fuchtling | |
| 2019/0104682 A1* | 4/2019 | Mossman | A01D 41/14 |
| 2019/0114847 A1* | 4/2019 | Wagner | G05D 1/0016 |

FOREIGN PATENT DOCUMENTS

| | | | |
|---|---|---|---|
| EP | 2382854 A1 | 11/2011 | |
| EP | 2586286 A1 | 5/2013 | |
| EP | 3469878 A1 * | 4/2019 | A01D 57/20 |
| EP | 3476199 A1 | 5/2019 | |

\* cited by examiner

AUTOMATED BELT SPEED CONTROL

FIELD OF THE DESCRIPTION

The present description relates to a control system for a draper belt. More specifically, the present description relates to a draper belt control system of an agricultural harvester that monitors and controls an operating characteristic of the draper belt.

BACKGROUND

Agricultural harvesters, such as combines or windrowers, travel through fields of agricultural crop, harvesting the crop. In one common arrangement, agricultural harvesting heads extend forward from the agricultural harvester to engage the plant stalks, sever them, and carry the severed crop into the body of the agricultural harvester itself. In the agricultural harvester body, the severed crop is separated into desired products (e.g., grain) and undesired products (e.g., chaff, stalks, cobs, etc.). The desired products are stored in a tank of the agricultural harvester and the undesired products are discarded out the rear of the harvester.

Agricultural harvesters can also include one or more feeding tracks within the agricultural harvesting head that move the severed plants into the body of the agricultural harvester itself. However, in operation, received crop can be caught and pulled under the feeding tracks resulting from an uneven distribution of crop across the agricultural header. This often requires an operator of the agricultural harvester to stop a harvesting operation and manually dislodge the trapped crop prior to continuing the harvesting operation.

The discussion above is merely provided for general background information and is not intended to be used as an aid in determining the scope of the claimed subject matter.

SUMMARY

An agricultural harvesting machine includes a header, a feederhouse and a draper belt configured to transport agricultural material to the feederhouse of the agricultural harvesting machine. The agricultural harvesting machine also includes a motor configured to drive the draper belt and a draper belt control system configured to determine a distribution of crop across the header of the agricultural harvesting machine and, based on the distribution of crop, generate a control signal for the motor to modify an operating characteristic of the draper belt.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Often times, an agricultural harvester includes one or more draper belts that move severed material, that is harvested from an agricultural field, into a header of the agricultural harvesting machine. In one example, this includes one or more draper belts on each side of the header configured to receive and move severed material to a center section of the agricultural header. As the crop from one side of the header moves toward the center section, it engages the crop from the other side which is also moving toward the center section. These crops, traveling in opposite, directions, engage one another and this inhibits the crop from overshooting the center section. However, as an agricultural harvester traverses the agricultural field, a crop distribution along the header might not be evenly distributed. For example, along edges of the agricultural field, narrow rows of crop may be present that do not extend along the entire width of the header. Often times, when a distribution of crop is not evenly distributed along the header, the crop is only received along one side of the header, and, as a result, when the draper belt on that side moves the crop toward the center section of the header, the crop can overshoot the center section and become lodged under a section of the header. This will be discussed further with respect to FIG. 2B.

The present description proceeds with respect to a draper belt control system that monitors a distribution of crop along the header of the agricultural harvester or combine, and, based on the distribution, generates control signals to modify an operating characteristic of the draper belt of the agricultural harvester. In one example, by modifying an operating characteristic of a draper belt when a distribution of crop is not evenly distributed along the header, a risk of crop becoming trapped under the draper belt or lodged under other components is mitigated.

Figure 1:
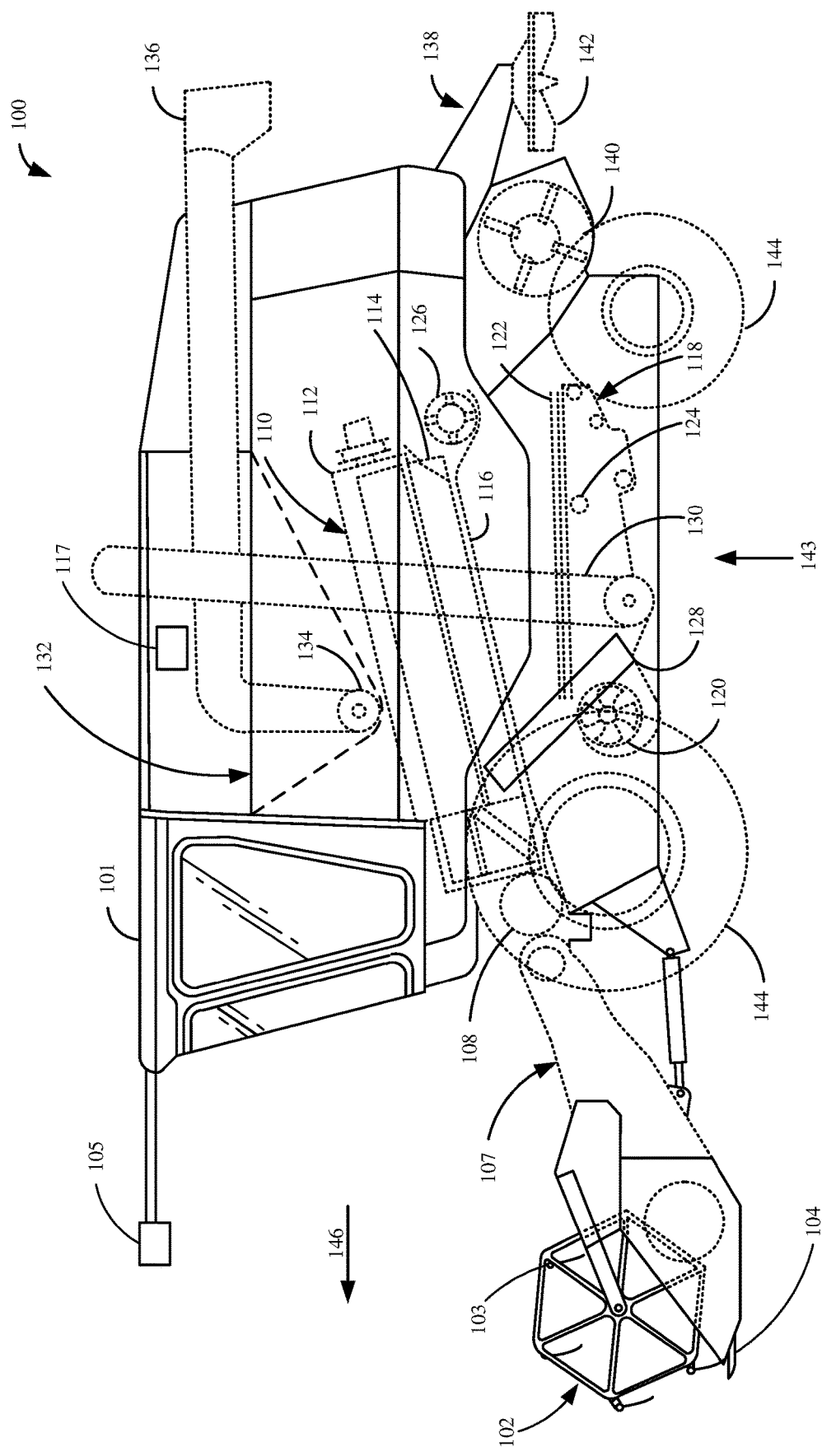
FIG. 1 is a partial pictorial, partial schematic illustration of one example of an agricultural machine.

FIG. 1 is a partial pictorial, partial schematic illustration of an agricultural machine 100 in which machine 100 is a combine harvester (also referred to as machine 100 or combine 100). Machine 100 illustratively includes an operator compartment 101 that can have a variety of different operator interface mechanisms for controlling machine 100. Machine 100 also illustratively (in one example) includes sensor(s) 105, a draper belt control system 117 and a header 102 with a cutter 104, a reel 103 and at least one feeding track that moves severed crop into a center section of header 102. Feeding tracks can include one or more draper belts that transport the severed crop to the center section of header 102 as will be discussed with respect to FIGS. 2A-2B. Machine 100 also includes feeder house 107, a feed accelerator 108 and a threshing subsystem 110. Threshing subsystem 110 includes a threshing rotor 112 and a set of concaves 114.

Additionally, machine 100 includes a separator subsystem 116 that includes a separator rotor, a cleaning subsystem (or cleaning shoe) 118 that, itself, can include a cleaning fan 120, chaffer 122 and sieve 124, and a material handling subsystem 112 that includes (in addition to feeder house 107 and feed accelerator 108) discharge beater 126, tailings elevator 128, clean grain elevator 130 (that moves clean grain into clean grain tank 132) as well as unloading auger 134 and spout 136. Machine 100 can also include a residue subsystem 138 that includes chopper 140 and spreader 142, and a propulsion subsystem that includes an engine that drives ground engaging wheels 144 or tracks, etc. It will be noted that machine 100 may also have more than one of any of the subsystems mentioned above (such as left and right cleaning shows, separators, etc.).

In operation, and by way of overview, machine 100 illustratively moves through a field in the direction indicated by arrow 146. In the example where sensors 105 are used, sensor(s) 105 are mounted to machine 100 and are configured to generate sensor signals indicative of a crop distribution across header 102 and provide these signals to draper belt control system 117. Draper belt control system 117, based on a distribution of crop across header 104, generates control signal(s) to modify an operating characteristic (e.g., belt speed) of one or more draper belts. In other examples, such as where sensors 105 are not used, draper belt control system 117 can obtain mapping data indicative of unharvested and harvested crop locations within the agricultural field. Using the obtained mapping data and machine data, system 117 can automatically or semi-automatically generate control signals for the one or more draper belts as will be discussed in more detail below with respect to FIG. 3. Briefly, by way of overview, as machine 100 moves along the field, header 102 engages the crop to be harvested and gathers it towards cutter 104. After the crop is cut, the crop can be engaged by reel 103 that moves the crop to one or more draper belts, which in turn, move the crop to a center section of header 102 prior to being moved to feeder house 107. In one example, sensor(s) 105 can include an image capture sensor, among a variety of other sensor(s), that capture an image of an area forward of header 102. The captured image can be used to identify a distribution of crop across header 102, and, based on the distribution, draper belt control system 117 can generate control signal(s) to modify the speed of the one or more draper belts so the crop does not overshoot the center section of the machine where it is transported into the machine for further processing.

Upon being received by feederhouse 107, the crop is provided to feed accelerator 108 and is accelerated into threshing subsystem 110. The crop is threshed by rotor 112 rotating the crop against concaves 114.

The threshed crop is moved to a separator rotor in separator 116 where some of the residue is moved by discharge beater 126 toward the residue subsystem 138. It can be chopped by residue chopper 140 and spread on the field by spreader 142. In other examples, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in machine 100 toward the residue handling subsystem 138.

Tailings can be moved by tailings elevator 128 back to threshing subsystem 110 where they can be re-threshed. Alternatively, the tailings can also be passed to a separate re-threshing mechanism (also using a tailings elevator or another transport mechanism) where they can be re-threshed as well.

Figure 2A:
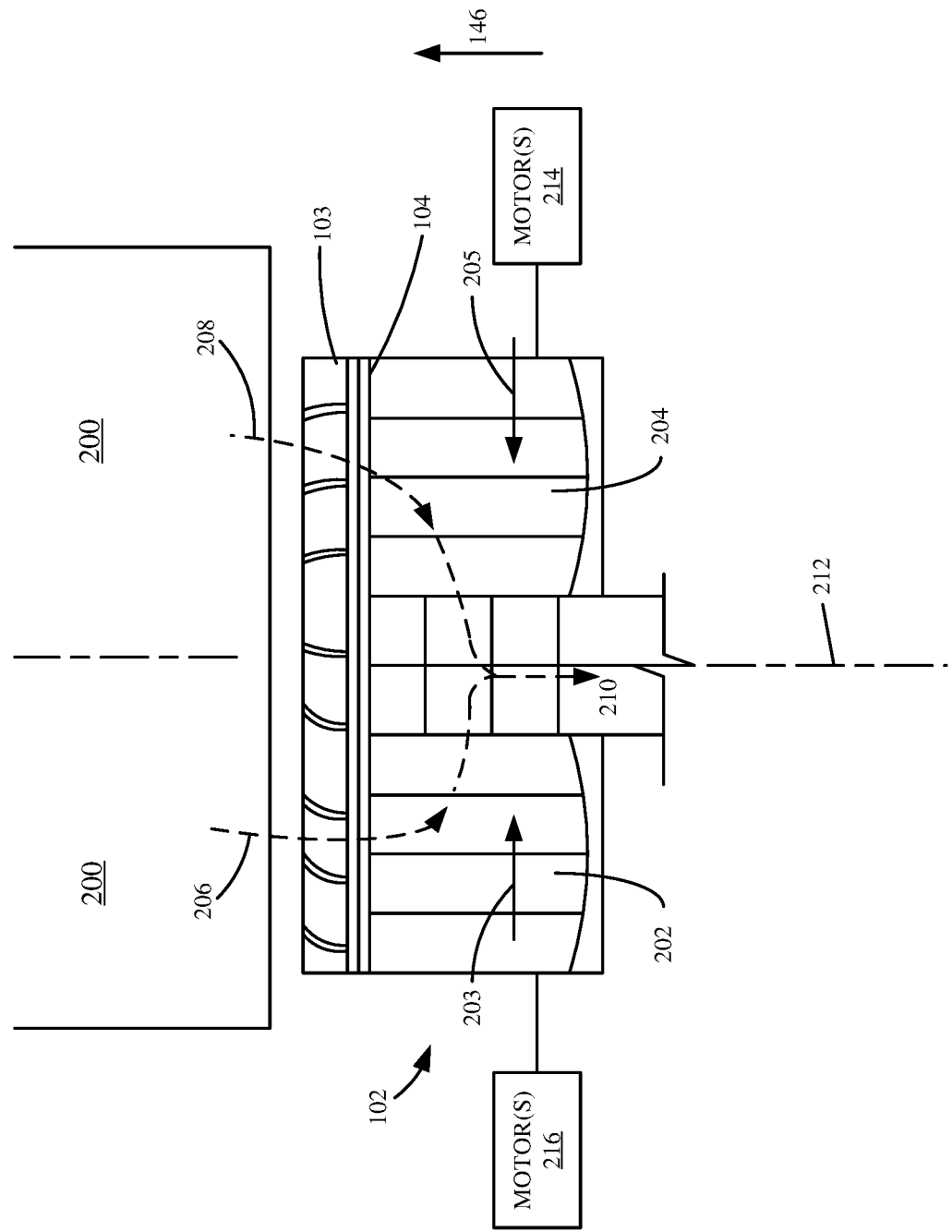
FIGS. 2A-2B are illustrations of a header of an agricultural harvesting machine or combine.
Figure 2B:
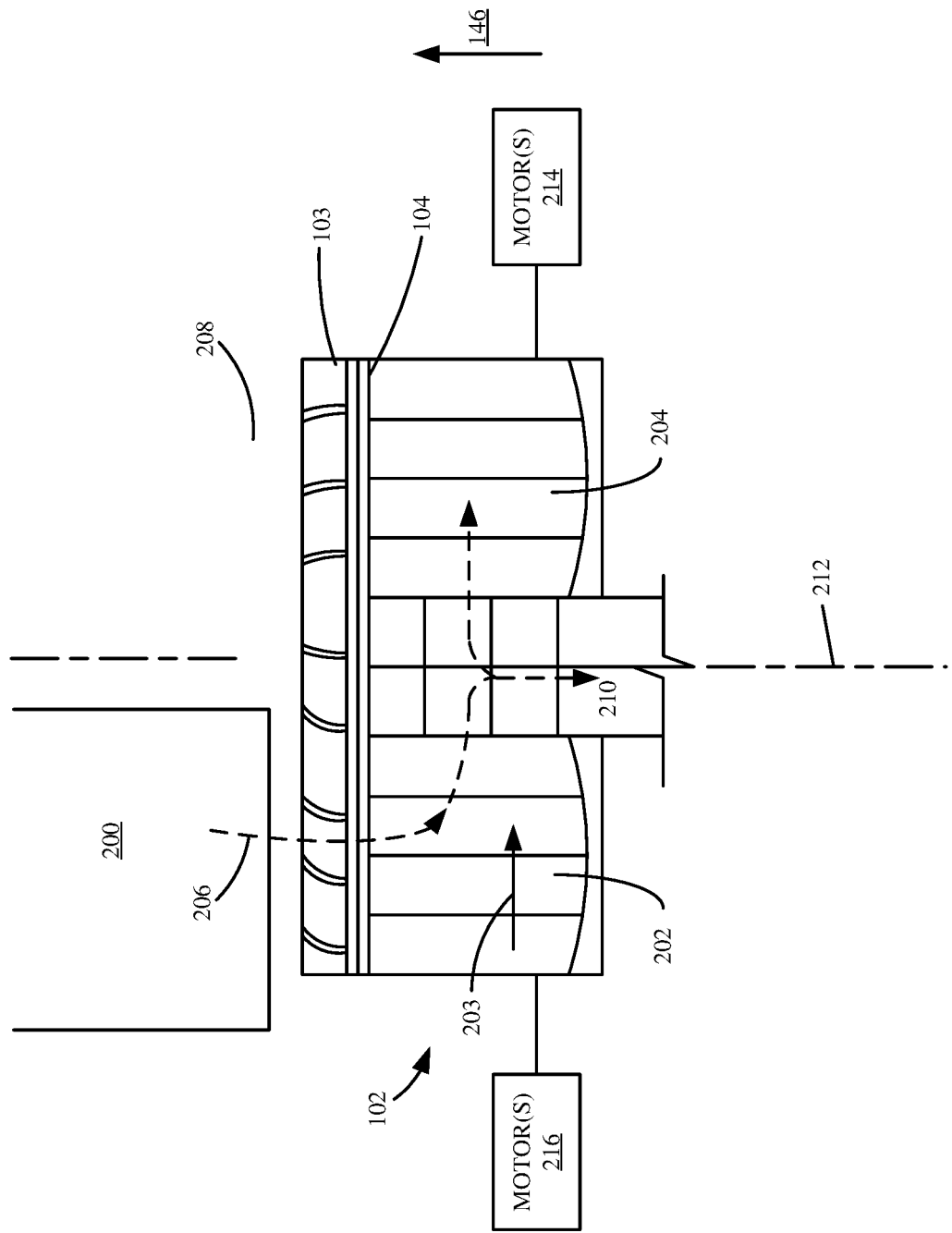

FIGS. 2A-2B are illustrations of a portion of header 102 of agricultural harvesting machine or combine 100, in one example. As illustratively shown in FIG. 2A, header 102 illustratively includes reel 103, cutter 104, motor(s) 214 and 216, and draper belt(s) 202 and 204 configured to transport crop 200 along pathways 206 and 208, respectively, to a center section 210 of header 102 prior to being moved to a feeder house, e.g., feeder house 107 shown in FIG. 1. While header 102 is shown with motor(s) 214 and 216, it is contemplated that header 102 can include a single motor (or any number of motors) to drive draper belt(s) 202 and 204.

For the sake of example only, it will now be assumed that header 102 is divided along line 212 such that draper belt(s) include left draper belt(s) 202 and right draper belt(s) 204. Left and right draper belt(s) 202 and 204 are driven by motor(s) 216 and 214, respectively. As shown in FIG. 2A, in operation, crop 200 on the left side of line 212 is cut by cutter 104 and gathered by reel 103 onto left draper belt(s) 202. Draper belt 202 moves in the direction indicated by arrow 203. Therefore, the crop 200 moves along travel path 206. The crop 200 on the right side of line 212 is cut by cutter 104 and gathered by reel 103 onto right draper belt(s) 204 which moves in the direction indicated by arrow 205. Therefore, the crop 200 moves along travel path 208. Crop 200 received from both left and right draper belts 202 and 204 come into contact with each other generally at center section 210. The momentum of the crop moved by draper belt 202 offsets the momentum of crop moved by draper belt 204 so the lateral movement of crops (in the direction indicated by arrows 203 and 205) substantially stops and the crop from both belts can be moved toward feeder house 107.

However, as illustratively shown in FIG. 2B, it can happen that crop 200 is only engaged by one side of header 102 and then is moved toward center section 210. This means that, because no crop is entering from right draper belt 204, the momentum of crop entering from left draper belt 202 can cause it to overshoot center section 210. This can cause it to come into contact with, and become trapped under, right draper belt(s) 204. Once jammed, an operator of harvester 100 often has to stop the harvesting operation and unplug header 102 before the harvesting operation can continue.

In one example, upon detecting crop 200 is only being engaged by one side of header 102 (as illustratively shown in FIG. 2B), draper belt control system 117 generates control signals to modify an operating characteristic of draper belt(s) 202 and 204. This can include generating control signals for motor(s) 214 and 216 (that drive draper belt(s) 202 and 204) to modify a speed of draper belt(s) 202 and 204. In this example, upon determining that crop 200 is distributed on only one side of header 102, draper belt control system 117 can generate control signals to reduce an operating speed of draper belt(s) 202 and 204 to reduce the likelihood that the crop 200 will overshoot center section 210 and become jammed. This will now be discussed further with respect to FIG. 3.

Figure 3:
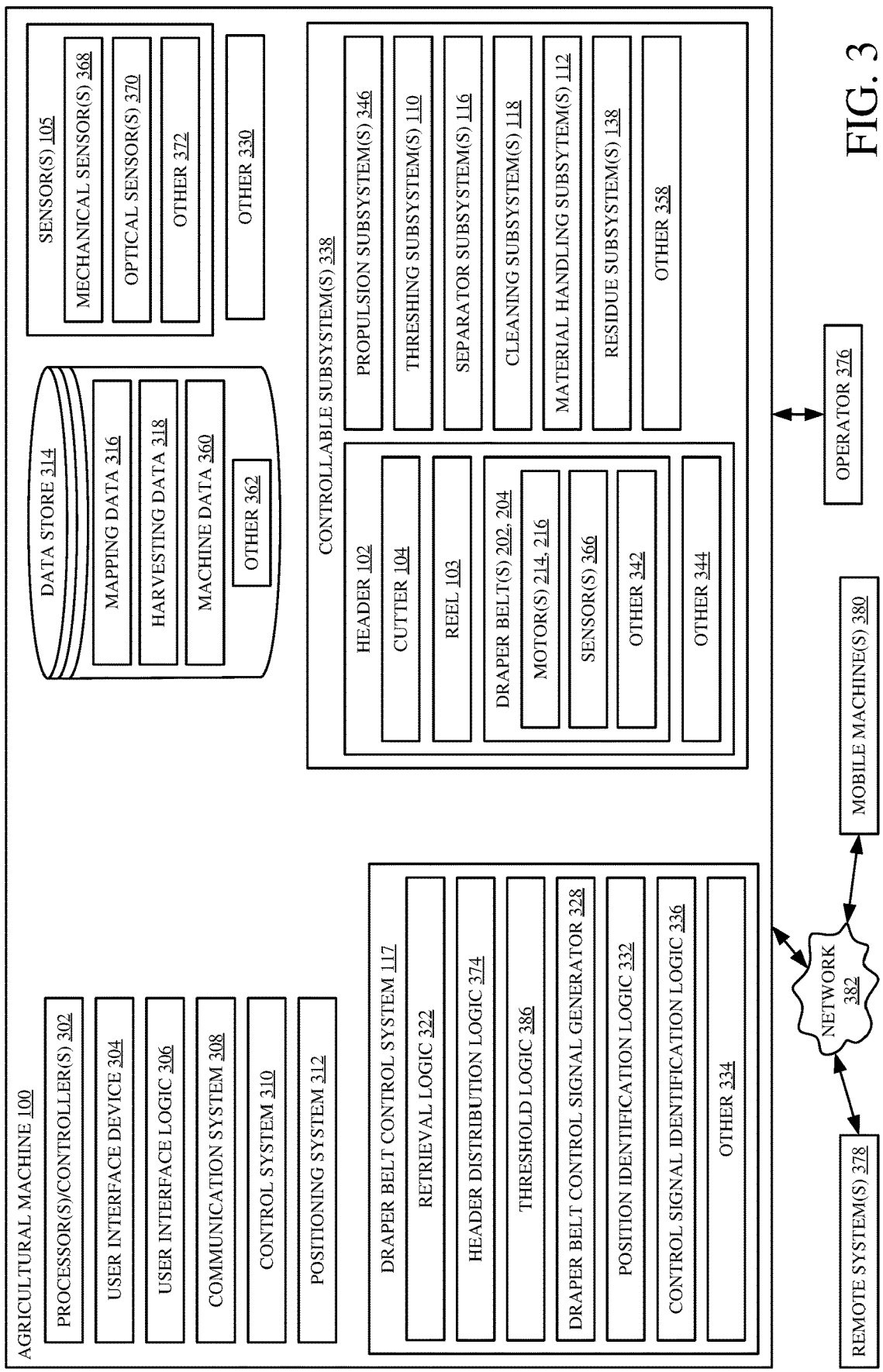
FIG. 3 is a simplified block diagram showing some components of an agricultural machine, in one example.

FIG. 3 is a simplified block diagram showing some components of agricultural machine 100, in one example. Before describing the operation of draper belt control system 117 in more detail, a brief description of some of the items in machine 100 and their operation, will first be provided. Machine 100 illustratively includes processor(s)/controller(s) 302, a user interface device 304, user interface logic 306, a communication system 308, a control system 310, a positioning system 312, a data store 314, controllable subsystem(s) 338, sensor(s) 105 and draper belt control system 117. Additionally, in some examples, machine 100 can be communicatively coupled to remote system(s) 378 and/or other mobile machine(s) 380 over network 382. Network 382 can be any of a wide variety of different types of networks, such as a wide area network, a local area network, a near field communication network, a cellular network, or any of a wide variety of other networks or combinations of networks. Remote system(s) 378 can include a wide variety of different remote systems (or a plurality of remote systems) including a remote computing system accessible by the other items in FIG. 3. (e.g., by draper belt control system 117, etc.).

Control system 310 can generate control signals for controlling a variety of different controllable subsystem(s) 338 based on a position signal generated from positioning system 312, based on sensor signals generated by sensor(s) 366 and 105, based on feedback received from draper belt control system 117, remote system(s) 378 and/or mobile machine(s) 380, based on operator inputs received by an operator 376 of machine 100 through user interface device(s) 304, or it can generate control signals in a wide variety of other ways as well.

Controllable subsystem(s) 338 can include a wide variety of mechanical, electrical, hydraulic, pneumatic, computer implemented and other systems of machine 100 that relate to the movement of the machine, the operation that is performed, and other controllable features. In one example, controllable subsystem(s) 338 include propulsion subsystem(s) 346, threshing subsystem(s) 110, separator subsystem(s) 116, cleaning subsystem(s) 118, material handling subsystem(s) 112, residue subsystem(s) 138 and controllable subsystem(s) of header 102 which can include cutter 104, reel 103 and draper belt(s) 202 and 204 (and their corresponding motors), among a variety of other subsystem(s) 358.

In operation, draper belt(s) 202 and 204 move severed crop cut by cutter 104 to a center section of header 102 prior to the severed crop being moved to feeder house 107. Draper belt(s) 202 and 204 can be controlled by one or more motor(s) 214 and 216. Sensor(s) 366 can include one or more sensors configured to measure an operating characteristic of draper belt(s) 202 and 204. For example, sensor(s) 366 can include speed sensors that measure an operating speed of draper belt(s) 202 and 204. The sensor signal indicative of the sensed speed can then be provided to draper belt control system 117 and can be used to identify which control signal(s) should be generated, as will be discussed further below with respect to draper belt control system 117.

Communication system 308 can include one or more communication systems that allow machine 100 to communicate with remote system(s) 378 and/or mobile machine(s) 380 over network 382. Additionally, communication system 308 can include communication systems that allow components of machine 100 to communicate with each other.

User interface device 304 can include display devices, mechanical or electrical devices, audio devices, haptic devices, and a variety of other devices. In one example, user interface logic 306 generates an operator display on user interface device 304 which can include a display device that is integrated into operator compartment 101 within machine 100, or it can be a separate display on a separate device that can be carried by operator 376 (such as a laptop, a mobile device, etc.). Positioning system 312 can include a global positioning system (GPS) receiver, a LORAN system, a dead reckoning system, a cellular triangulation system, or other positioning system. In one example operation, position information can be generated by positioning system 312 and provided to draper belt control system 117 in order to determine a position and direction of travel of machine 100 within an agricultural field.

Sensor(s) 105 can include a wide variety of sensor(s) such as mechanical sensor(s) 368, optical sensor(s) 370, and a variety of other sensor(s) 372. Sensor(s) 105 can be positioned on machine 100 such that sensor(s) 105 can determine a distribution of crop along header 102. For example, sensor(s) 105 can be positioned on a front of machine 100 and can include optical sensor(s) 370 that generate signals indicative of a crop distribution along header 102. This can include generating image data that can be processed to determine a crop distribution along header 102. Sensor(s) 105 can also include mechanical sensor(s) 368 that physically extend along header 102 and contact crop in front of header 102. In some examples, based on the received sensor signal(s) from sensor(s) 105, draper belt control system 117 can determine a crop distribution across header 102 as will be discussed later.

Where sensors 105 are not used, the distribution of crop along header 102 can be identified by accessing mapping data and other data. Data store 314 can store any or all data pertaining to an operation and/or configuration of machine 100. This can include mapping data 316, harvesting data 318, machine data 360 among a variety of other data 362. In operation, any or all data from data store 314 can be provided to draper belt control system 117 and used to determine a distribution of crop across header 102. Mapping data 316, in one example, includes coverage data for an agricultural field that can be used by draper belt control system 117 to identify locations where crop is harvested or unharvested within the agricultural field. Machine data 360 can include dimensional information for machine 100 that, in one example, includes dimensional information that indicates the width of header 102. Based on the mapping data 316 (indicative of where crop has already been harvested), machine position and direction of travel, and the width of header 102, draper belt control system 117 can determine how much of header 102 is engaging crop (e.g., a distribution of crop along header 102) as machine 100 moves through the agricultural field.

More specifically, in some examples, the mapping data 316 in data store 314 can include harvesting data 318. Harvesting data 318 can be obtained from machine 100 or other mobile machine(s) 380. Harvesting data 318 can identify a previous path of machine 100 or other mobile machine(s) 380 through an agricultural field so machine 100 can determine what parts of the field have already been harvested. In some examples, draper belt control system 117 can obtain harvesting data 318 to identify a previous path of machine 100 or other mobile machine(s) 380 through an agricultural field using the harvesting data. In this example, as is described in greater detail below, draper belt control system 117 can use the current position and direction of travel of machine 100, harvesting data 318 and machine data 360 (indicative of the width of header 102) to determine a crop distribution along header 102. Based on the distribution, system 117 can automatically or semi-automatically generate control signal(s) to modify an operating characteristic (e.g., speed) of draper belt(s) 202 and 204 prior to harvesting crop distributed along only one side of header 102.

Furthermore, in some examples, data within data store 314 can be obtained based on received user inputs from operator 376, and/or can be obtained from remote system(s) 378 and/or other mobile machine(s) 380. Additionally, data within data store 314 can be shared with other mobile machine(s) 380 and remote system(s) 378 over network 382.

Now turning to draper belt control system 117, draper belt control system 117 determines a distribution of crop along header 102. It can do this in a number of different ways. Based on the determination, control system 117 generates control signals to modify an operating characteristic (e.g., speed) of draper belt(s) 202 and 204. Draper belt control system 117 includes retrieval logic 322, header distribution logic 374, threshold logic 386, a draper belt control signal generator 328, position identification logic 332, control signal identification logic 336, among a variety of other logic 334.

In operation, header distribution logic 374 determines a distribution of crop along header 102 and generates a distribution output indicative of the distribution. For example, header distribution logic 374 can utilize retrieval logic 322 to obtain mapping, harvesting and machine data from data store 314. Additionally, position identification logic 332 can determine a position and heading of machine 100 within a field based on information generated from positioning system 312. A position output indicative of the determined position and heading can then be provided to header distribution logic 374. Based on the received position information, machine data, and harvesting data (or coverage data), header distribution logic 374 can determine a crop distribution along header 102 by determining whether any portion of the field over which header 102 is traveling has already been harvested. If so, it determines what part of the header 102 is engaging crop and what part is not.

For example, based on a determined position of machine 100 within a field and coverage information for the field, header distribution logic 374 can determine which areas within the field have already been harvested and which areas within the field still need to be harvested. For the areas that still need to be harvested, header distribution logic 374 can use the dimensional information for header 102, along with the position and heading information for machine 100, to determine whether the header 102 is engaging crop along its full width or whether some of the crop has already been harvested. If header 102 is not engaging crop along its entire width, then header distribution logic 374 can determine whether the crop is evenly distributed along header 102 (about the center line 212).

As discussed above, in one example, header 102 can be thought of as being divided along a center line (e.g., center line 212 shown in FIGS. 2A-2B) into right and left sections wherein crop received along a left section of header 102 comes into contact with left draper belt(s) 202 and crop received along a right section of header 102 comes into contact with right draper belt(s) 204. Header distribution logic 374 can determine whether crop being engaged by header 102 will contact the left and/or right sections of header 102. If the crop is evenly distributed along header 102 (e.g., there is roughly an equal amount being engaged on both sides of center line 212) or contacts both the right and left sections, draper belt(s) 202 and 204 can be operated normally. However, if the crop will only contact the left or right section of header 102, draper belt control system 117 generates control signals for draper belt(s) 202 and 204 to reduce the likelihood of the crop overshooting center line 212, as will be discussed in detail below.

In some examples, a distribution of crop refers to crop that is currently contacting header 102. However, in other examples, a distribution of crop can refer to crop located a set distance (lead distance) in front of header 102. In the latter example, an operating characteristic of draper belt(s) 202 and 204 can be changed prior to coming into the contact with crops positioned the set distance in front of header 102. A set distance (lead distance) can include a variety of distances such as a few feet, meter(s), etc.

In other examples, header distribution logic 374 can receive sensor signal(s) from sensor(s) 105 and can determine a distribution of crop along header 102 based on the received sensor signals. For example, sensor(s) 105 can include an optical sensor configured to provide an image of crops in front of header 102. Header distribution logic 374 can receive the sensor signal(s) and perform image processing to determine a distribution of crop along header 102. However, other sensor(s) can be used as well.

Upon determining a distribution of crop along header 102, a distribution output can be provided to threshold logic 386 indicative of the distribution. In other examples, the distribution output can be provided directly to draper belt control signal generator 328 which, upon receiving the output, generates control signals to modify an operating characteristic of draper belt(s) 202 and 204. However, in the present example, threshold logic 386 receives the distribution output from header distribution logic 374 and compares the determined distribution (the amount of crop engaged on each side of header 102) to a threshold value. A threshold value can include a percentage indicative of what percentage of the header 102, on each side of center line 212, is being contacted by crop. The threshold value can be a numerical value, or any of a variety of other threshold values.

In one example, if the comparison to a threshold value indicates unharvested crop is only configured to contact one section of header 102 (e.g., either the right or left section), a threshold output can be provided to control signal identification logic 336. Control signal identification logic 336, upon receiving the threshold output from threshold logic 386, identifies control signal(s) for draper belt(s) 202 and 204 to accommodate the uneven distribution of crop along header 102. In one example, control signal identification logic 336 can receive sensor signal(s) from sensor(s) 366 to identify a current operating characteristic of draper belt(s) 202 and 204. For example, sensor(s) 366 can measure a current operating speed of draper belt(s) 202 and 204 and can generate sensor signal(s) indicative of the speed to control signal identification logic 336. Control signal identification logic 336, upon receiving the sensor signal(s) from sensor(s) 366 and the threshold output, can determine control signal(s) to control draper belt(s) 202 and 204 to reduce the likelihood that the momentum of the crop will carry it across center line 212 and jam the draper belt on the opposite side. In one example, the control signals can reduce the operating speed of draper belt(s) 202 and 204. Once the control signal(s) are identified, a signal output can be generated and provided to draper belt control signal generator 328.

Draper belt control signal generator 328, upon receiving the signal output from control signal identification logic 336, generates control signal(s) in accordance with the identified control signal(s). In one example, this can include generating control signal(s) for motor(s) 214 and 216 to reduce the operating speed of draper belt(s) 202 and 204. By reducing the operating speed of draper belt(s) 202 and 204 when unharvested crop is only received along one side of header 102, received crop can be moved to a center section of header 102 at a reduced speed. This reduces the momentum of the crop when it arrives at the center section of header 102 and thus eliminates, or reduces the risk of, crop being trapped under the opposite draper belt. Additionally, in operation, when header distribution logic 374 determines unharvested crop is distributed evenly along both sides of header 102, draper belt control signal generator 328 can generate control signal(s) to increase the operating speed of draper belt(s) 202 and 204.

Figure 4:
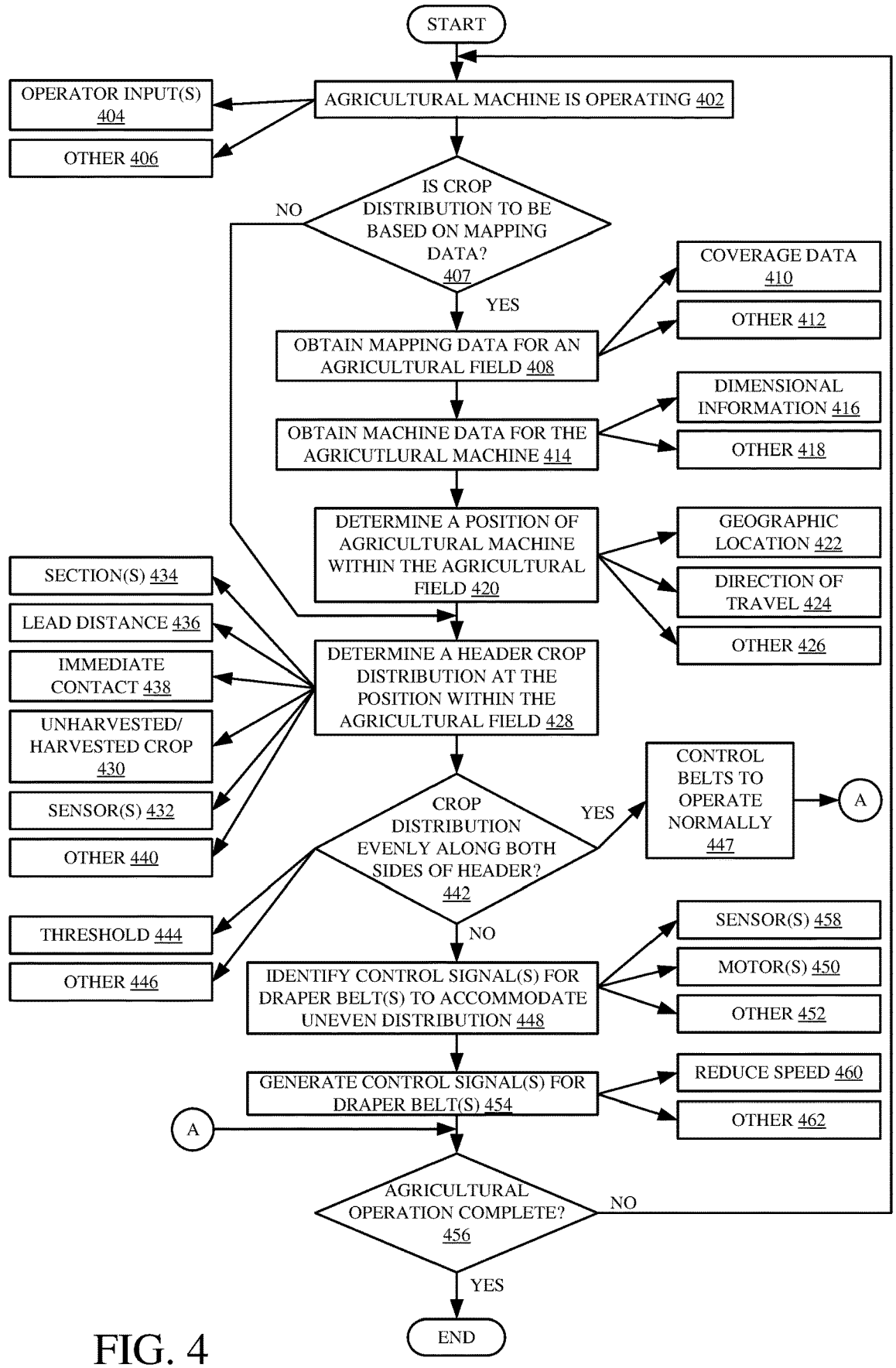
FIG. 4 is a flow diagram showing one example operation of a draper belt control system shown in FIG. 3.

FIG. 4 is a flow diagram showing one example operation of draper belt control system 117 shown in FIG. 3. More specifically, the operation of FIG. 4 is one example operation in which draper belt control system 117 determines a distribution of crop along header 102, and, based on the distribution, generates control signals for one or more draper belt(s) 202 and 204 of agricultural machine 100. Additionally, it is to be understood that the operation can be carried out at any time during operation of machine 100 in which a crop is to be harvested.

It is initially assumed that machine 100 is operating, as indicated by block 402. In one example, machine 100 can be operated in accordance with a harvesting operation in which a crop within an agricultural field is to be harvested. This can be based on operator input(s) as indicated by block 404, or a variety of other inputs as indicated by block 406. Once machine 100 is operating, processing turns to block 407 where it is determined whether the crop distribution along header 102 is to be determined based on mapping data or based on sensor data (such as from sensor(s) 105). If it is to be determined from sensor data, processing moves to block 428 (described below). If it is to be based on mapping data, processing continues at block 408 where header distribution logic 374 of draper belt control system 117 obtains mapping data 316 from data store 314 using retrieval logic 322. In one example, mapping data 316 can include coverage data for the agricultural field to be harvested (e.g., it can indicate what portions of the field have already been harvested) as indicated by block 410, among a variety of other data as indicated by block 412.

Once the mapping data 316 for the agricultural field is obtained, processing turns to block 414 where header distribution logic 374 obtains machine data 360 for machine 100 from data store 314 using retrieval logic 322. Machine data 360 can include dimensional information for machine 100, as indicated by block 416, that can identify the width of header 102 on machine 100. However, machine data 360 can include a variety of other information for machine 100 as indicated by block 418.

Processing then turns to block 420 where position identification logic 332 of draper belt control system 117 determines a position of machine 100 within the agricultural field. In one example, position identification logic 332 can determine a position of machine 100 using positioning system 312 of machine 100. However, other ways to determine a position of machine 100 within the agricultural field are contemplated as well. In one example, a position of agricultural machine 100 can include a geographic location of machine 100 and header 102 within the agricultural field, as indicated by block 422, a direction of travel of machine 100 along the agricultural field, as indicated by block 424, among a variety of other positional information as indicated by block 426. A position output is then generated by position identification logic 332 and provided to header distribution logic 374 indicative of a position and direction of travel of machine 100 within the agricultural field.

Upon receiving the positional information from position identification logic 332, processing turns to block 428 where header distribution logic 374 determines a header crop distribution at the position within the agricultural field. In one example, determining a header crop distribution includes determining whether the header 102 is traveling over parts of the field that are unharvested or harvested based on the received mapping data, as indicated by block 430. Additionally, header distribution logic 374 can use the dimensional information for header 102 obtained from machine data 360 to determine whether the header 102 is engaging unharvested crop along its entire width and, if not, a particular crop distribution along header 102.

Additionally, in some examples, determining a crop distribution along header 102 can include considering header 102 as having multiple sections based on a location of one or more draper belt(s) 202 and 204 within machine 100. In one example, this is illustratively shown in FIGS. 2A-2B in which header 102 is considered to have two sections on different sides of line 212 (a right and left section). In this example, upon dividing header 102 into different sections, header distribution logic 374 can determine a distribution of crop along each section as indicated by block 434. Furthermore, a distribution of crop can be based on crop in immediate contact with header 102, as indicated by block 438, or crop located a lead distance in front of header 102 as indicated by block 436.

In an example in which the distribution of crop along header 102 is based on sensor signal(s) from sensor(s) 105 of machine 100, the sensor signals are received as indicated by block 432. In this example, sensor signal(s) from sensor(s) 105 can be provided to header distribution logic 374 and used to determine a distribution of crop along header 102. The crop distribution along header 102 can be determined in other ways as well. This is indicated by block 440.

Header distribution logic 374, upon determining a distribution of crop along header 102, generates a distribution output indicative of the distribution to threshold logic 386. Processing then turns to block 442 where threshold logic 386 receives the output from header distribution logic 374 and determines whether the crop is evenly distributed along both sides of header 102. In one example, this can include comparing the distribution of crop along header 102 to a threshold value, as indicated by block 444, that can be specific to each section of header 102. A threshold value can include a numerical value indicative of a quantity of crop contacting each section of header 102 (such as an indication of how many linear inches—or other units of measure—are contacting each section of header 102 relative to that of other sections, a percentage of crop contacting each section of header 102, among a variety of other threshold values, as indicated by block 446. However, by comparing the determined crop distribution to a threshold value, threshold logic 386 determines whether the crop is evenly distributed on both sides of header 102. If threshold logic 386 determines that crop is sufficiently evenly distributed along header 102, then the draper belts 202 and 204 are controlled to operate normally. This is indicated by block 447. Processing then turns to block 456 where a determination is made whether the agricultural operation is complete. Alternatively, if threshold logic 386 determines that a crop distribution is not sufficiently even along header 102, processing turns to block 448 where control signal identification logic 336 identifies a control signal to control one or more draper belt(s) 202 and 204 to accommodate for the uneven distribution.

In one example, identifying control signal(s) can include identifying control signal(s) for one or more motor(s) 214 and 216 that are configured to drive draper belt(s) 202 and 204 as indicated by block 450. However, a variety of other control signal(s) can be identified to control draper belt(s) 202 and 204 as indicated by block 452. Additionally, control signal identification logic 336 can receive sensor signal(s) from sensor(s) 366 indicative of a current operating characteristic of draper belt(s) 202 and 204 as indicated by block 458 and that can be used to generate the control signals as well. For example, sensor(s) 366 can include one or more speed sensor(s) that determine a current operating speed of draper belt(s) 202 and 204. Based on the received sensor signal(s), control signal identification logic 366 can determine one or more control signal(s) that change the operating speed(s) of the draper belt(s) to accommodate the uneven distribution.

Once the control signal(s) are identified by logic 336 for draper belt(s) 202 and 204, processing turns to block 454 where draper belt control signal generator 328 generates the control signal(s). In one example, control signals can include generating control signal(s) for one or more motor(s) 214 and 216 to reduce an operating speed of draper belt(s) 202 and 204 to accommodate for the uneven distribution along header 102 as indicated by block 460. However, a variety of other control signal(s) can be generated as well, as indicated by block 462. If each draper belt has its own motor then the motors can be controlled independently. If not, they can be controlled together.

Once the control signal(s) are generated for one or more draper belt(s) 202 and 204, processing turns to block 456 where a determination is made by draper belt control system 117 whether the agricultural operation is completed. If the agricultural operation is not completed, processing turns to block 407. Alternatively, if the agricultural operation is completed, processing subsequently ends.

Figure 5:
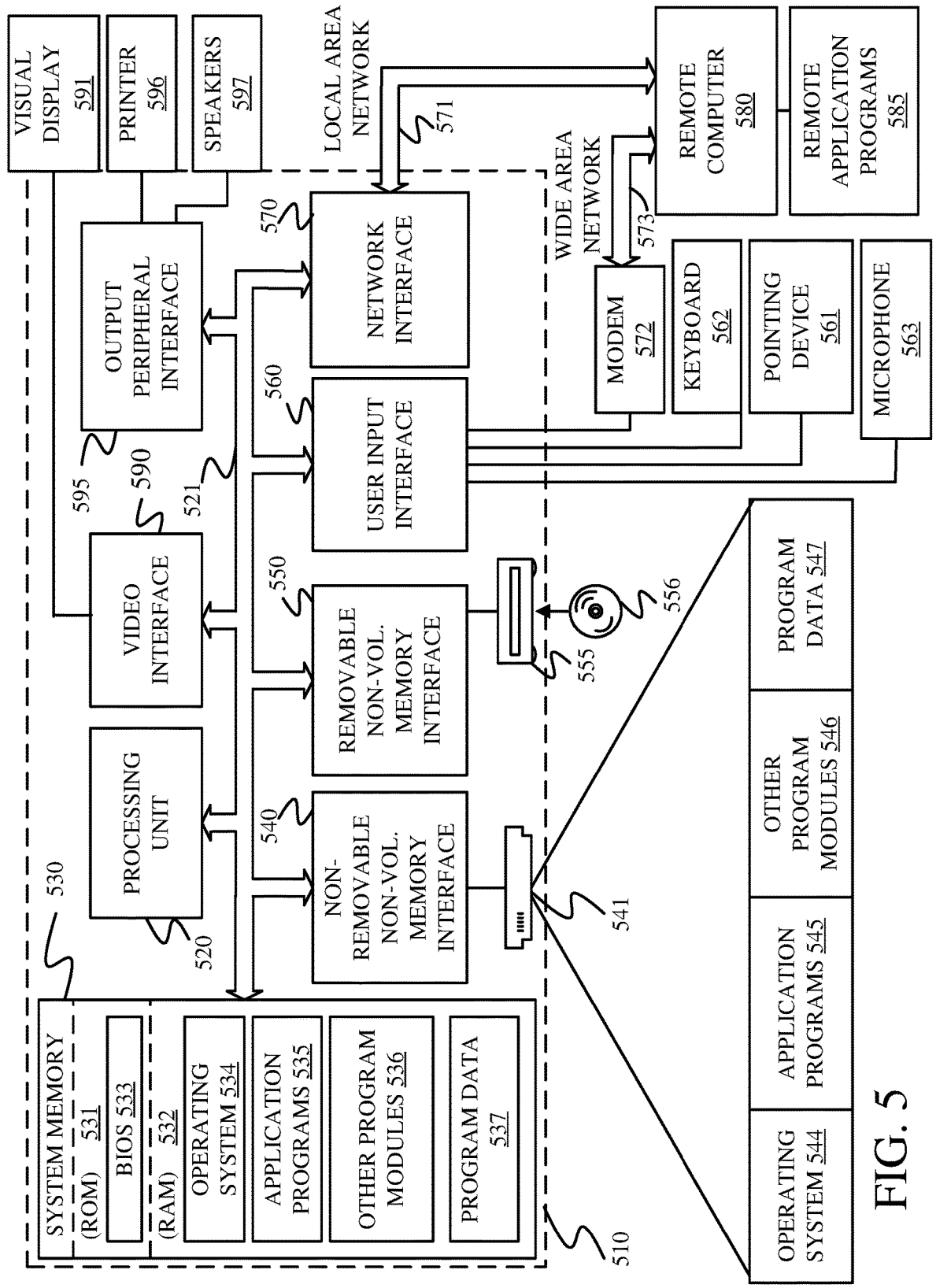
FIG. 5 is a schematic diagram of one example of a computing environment that can be used in the agricultural harvesting machine.

FIG. 5 is a block diagram of one example of a computing environment. With reference to FIG. 5, an example system for implementing some embodiments includes a general-purpose computing device in the form of a computer 510. Components of computer 510 may include, but are not limited to, a processing unit 520 (which can comprise processors or servers from other FIGS.), a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. Memory and programs described with respect to FIG. 2 can be deployed in corresponding portions of FIG. 5.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable volatile/nonvolatile computer storage media. By way of example only, FIG. 5 illustrates a hard disk drive 541 that reads from or writes to non-removable, nonvolatile magnetic media, an optical disk drive 555, and nonvolatile optical disk 556. The hard disk drive 541 is typically connected to the system bus 521 through a non-removable memory interface such as interface 540, and optical disk drive 555 are typically connected to the system bus 521 by a removable memory interface, such as interface 550.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537.

A user may enter commands and information into the computer 510 through input devices such as a keyboard 562, a microphone 563, and a pointing device 561, such as a mouse, trackball or touch pad. Other input devices (not shown) may include foot pedals, steering wheels, levers, buttons, a joystick, game pad, satellite dish, scanner, or the like. These and other input devices are often connected to the processing unit 520 through a user input interface 560 that is coupled to the system bus, but may be connected by other interface and bus structures. A visual display 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 is operated in a networked environment using logical connections (such as a local area network—LAN, or wide area network WAN) to one or more remote computers, such as a remote computer 580.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. In a networked environment, program modules may be stored in a remote memory storage device. FIG. 5 illustrates, for example, that remote application programs 585 can reside on remote computer 580.

It should also be noted that the different examples described herein can be combined in different ways. That is, parts of one or more examples can be combined with parts of one or more other examples. All of this is contemplated herein.

Example 1 is an agricultural harvesting machine, comprising:
a header;
a feederhouse;
a draper belt configured to transport agricultural material to the feederhouse of the agricultural harvesting machine;
a motor configured to drive the draper belt; and
a draper belt control system configured to determine a distribution of crop across the header of the agricultural harvesting machine and, based on the distribution of crop, generate a control signal for the motor to modify an operating characteristic of the draper belt.

Example 2 is the agricultural harvesting machine of any or all previous examples, wherein the draper belt control system comprises:
header distribution logic configured to identify the distribution of crop across the header and generate a distribution output indicative of the distribution.

Example 3 is the agricultural harvesting machine of any or all previous examples, further comprising:
retrieval logic configured to obtain and provide mapping data indicative of unharvested and harvested crop locations within an agricultural field and machine data indicating dimensional information for the header of the agricultural harvesting machine to the header distribution logic in order to identify the distribution of crop across the header.

Example 4 is the agricultural harvesting machine of any or all previous examples, further comprising:
a sensor configured to generate a sensor signal indicative of the distribution of crop across the header and provide the sensor signal to the header distribution logic in order to identify the distribution of crop across the header.

Example 5 is the agricultural harvesting machine of any or all previous examples, wherein the sensor comprises:
an optical sensor, that senses an optical image of crop adjacent the header, configured to generate the signal indicative of the distribution of crop across the header.

Example 6 is the agricultural harvesting machine of any or all previous examples, wherein the header distribution logic is further configured to determine the crop distribution along each of a plurality of different sections of the header and generate the distribution signal indicative of the distribution along the plurality of different sections.

Example 7 is the agricultural harvesting machine of any or all previous examples, wherein the draper belt control system further comprises:
threshold logic configured to receive the distribution output from the header distribution logic, compare the distribution of crop along the header to a threshold distribution value, and, generate a threshold output indicative of the comparison of the distribution to the threshold distribution value.

Example 8 is the agricultural harvesting machine of any or all previous examples, wherein the draper belt control system further comprises:
control signal identification logic configured to receive the threshold output, and, based on the received threshold output, identify the control signal for the draper belt to modify the operating characteristic of the draper belt, and generate a signal output indicative of the identified control signals.

Example 9 is the agricultural harvesting machine of any or all previous examples, wherein the draper belt control system further comprises:

a draper belt control signal generator configured to receive the signal output from the control signal identification logic and generate the control signal for the draper belt based on the signal output.

Example 10 is the agricultural harvesting machine of any or all previous examples, wherein the draper belt control signal generator generates the control signal to control an operating speed of the draper belt.

Example 11 is a method of controlling at least one draper belt of an agricultural harvesting machine, comprising:
obtaining mapping data indicative of unharvested and harvested crop locations within an agricultural field and machine data indicative of dimensional information for a header of the agricultural harvesting machine;
determining a distribution of crop across the header of the agricultural harvesting machine at a position within the agricultural field based on the obtained mapping and machine data;
identifying control signals for the draper belt based on the determined distribution of crop across the header of the agricultural harvesting machine; and
generating the control signals for the draper belt based on the identified control signals.

Example 12 is the method of any or all previous examples, wherein determining the distribution of crop across the header comprises:
determining a crop distribution along each of a plurality of different sections of the header based on the obtained mapping and machine data.

Example 13 is the method of any or all previous examples, wherein identifying control signals for the draper belt comprises:
receiving sensor signals indicative of an operating speed of the draper belt from a sensor operably coupled to the draper belt;
determining the operating speed of the draper belt based on the received sensor signals; and
identifying the control signals for the draper belt based on the determined distribution of crop across the header and the determined operating speed of the draper belt.

Example 14 is the method of any or all previous examples, wherein determining the distribution of crop across the header of the agricultural harvesting machine comprises:
determining the distribution of crop located a lead distance in front of the agricultural harvesting machine based on the obtained mapping and machine data.

Example 15 is the method of any or all previous examples, wherein generating the control signals for the draper belt comprises:
generating control signals for a motor that drives the draper belt in order to modify an operating speed of the draper belt.

Example 16 is an agricultural harvesting machine, comprising:
a header configured to receive agricultural material from an agricultural field, the header comprising:
a first draper belt, located on a first side of the header, configured to transport the material to a center section of the header;
a second draper belt, located on a second side of the header, configured to transport the material to the center section of the header; and
at least one motor configured to drive the first and second draper belts; and
a draper belt control system configured to determine a distribution of agricultural material across the header of the agricultural harvesting machine, and, based on the determined distribution, generate a control signal for the at least one motor to modify an operating characteristic of at least one of the first and the second draper belts.

Example 17 is the agricultural harvesting machine of any or all previous examples, wherein the operating characteristic comprises an operating speed of at least one of the first and second draper belts.

Example 18 is the agricultural harvesting machine of any or all previous examples, wherein the draper belt control system comprises:

position identification logic configured to determine a position of the agricultural harvesting machine within the agricultural field and generate a position output indicative of the determined position.

Example 19 is the agricultural harvesting machine of any or all previous examples, wherein the draper belt control system comprises:

header distribution logic configured to receive the position output from the position identification logic and determine the distribution of agricultural material across the header at the determined position within the agricultural field based on received mapping data indicating unharvested and harvested crop locations within the agricultural field and machine data for the agricultural harvesting machine.

Example 20 is the agricultural harvesting machine of any or all previous examples, wherein the draper belt control system comprises:

a crop distribution sensor configured to sense the distribution of agricultural material across the header.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural harvesting machine, comprising:
    a header;
    a feederhouse;
    a draper belt configured to transport agricultural material to the feederhouse of the agricultural harvesting machine;
    a motor configured to drive the draper belt; and
    a draper belt control system configured to determine a distribution of crop across the header of the agricultural harvesting machine, a distance in front of the agricultural harvesting machine and, based on the distribution of crop, generate a control signal for the motor to modify an operating characteristic of the draper belt.

2. The agricultural harvesting machine of claim 1, wherein the draper belt control system comprises:
    header distribution logic configured to identify the distribution of crop across the header and generate a distribution output indicative of the distribution.

3. The agricultural harvesting machine of claim 2, wherein the draper belt control system comprises:
    retrieval logic configured to obtain and provide mapping data indicative of unharvested and harvested crop locations within an agricultural field and machine data indicating dimensional information for the header of the agricultural harvesting machine to the header distribution logic in order to identify the distribution of crop across the header.

4. The agricultural harvesting machine of claim 2, further comprising:
    a sensor configured to generate a sensor signal indicative of the distribution of crop across the header and provide the sensor signal to the header distribution logic in order to identify the distribution of crop across the header.

5. The agricultural harvesting machine of claim 4, wherein the sensor comprises:
    an optical sensor, that senses an optical image of crop adjacent the header, configured to generate the signal indicative of the distribution of crop across the header.

6. The agricultural harvesting machine of claim 2, wherein the header distribution logic is further configured to determine the crop distribution along each of a plurality of different sections of the header and generate the distribution signal indicative of the distribution along the plurality of different sections.

7. The agricultural harvesting machine of claim 6, wherein the draper belt control system further comprises:
    threshold logic configured to receive the distribution output from the header distribution logic, compare the distribution of crop along the header to a threshold distribution value, and, generate a threshold output indicative of the comparison of the distribution to the threshold distribution value.

8. The agricultural harvesting machine of claim 7, wherein the draper belt control system further comprises:
    control signal identification logic configured to receive the threshold output, and, based on the received threshold output, identify the control signal for the draper belt to modify the operating characteristic of the draper belt, and generate a signal output indicative of the identified control signals.

9. The agricultural harvesting machine of claim 8, wherein the operating characteristic comprises an operating speed of the draper belt.

10. The agricultural harvesting machine of claim 9, further comprising:
    a second draper belt on an opposite side of the feederhouse than the draper belt, wherein the control signal identification logic identifies the control signal to control the operating speed of the draper belt based on agricultural material on the draper belt being expelled to the second draper belt.

11. A method of controlling a draper belt of an agricultural harvesting machine, comprising:
    obtaining mapping data indicative of unharvested and harvested crop locations within an agricultural field and machine data indicative of dimensional information for a header of the agricultural harvesting machine;
    determining a distribution of crop across the header a lead distance in front of the agricultural harvesting machine based on the obtained mapping and machine data;
    identifying control signals for the draper belt based on the determined distribution of crop across the header of the agricultural harvesting machine; and
    generating the control signals for the draper belt based on the identified control signals.

12. The method of claim 11, wherein determining the distribution of crop across the header comprises:
    determining a crop distribution along a first section of the header and a second section of the header that is opposite of a center of the header from the first section, based on the obtained mapping and machine data.

13. The method of claim 11, wherein identifying control signals for the draper belt comprises:

receiving sensor signals indicative of an operating speed of the draper belt from a sensor operably coupled to the draper belt;

determining the operating speed of the draper belt based on the received sensor signals; and identifying the control signals for the draper belt based on the determined distribution of crop across the header and the determined operating speed of the draper belt.

14. The method of claim 12, further comprising:

comparing the crop distribution along the first section to the crop distribution along the second section; and wherein identifying or generating the control signals is based on the comparison of the crop distribution along the first section to the crop distribution along the second section.

15. The method of 13, wherein generating the control signals for the draper belt comprises:

generating control signals for a motor that drives the draper belt in order to modify an operating speed of the draper belt.

16. An agricultural harvesting machine, comprising:

a header configured to receive agricultural material from an agricultural field, the header comprising:

a first draper belt, located on a first side of the header, configured to transport the material to a center section of the header;

a second draper belt, located on a second side of the header, configured to transport the material to the center section of the header; and at least one motor configured to drive the first and second draper belts; and a draper belt control system configured to determine a first distribution of agricultural material, forward of the machine, corresponding to the first draper belt and determine a second distribution of agricultural material, forward of the machine, corresponding to the second draper belt, and, based on a determination that the first distribution is a threshold amount greater than the second distribution, generate a control signal for the at least one motor to modify an operating speed of at least one of the first and the second draper belts.

17. The agricultural harvesting machine of claim 16, wherein the draper belt control system is configured to determine one or more of:

the first distribution of agricultural and the second distribution, a lead distance in front of the agricultural harvesting machine.

18. The agricultural harvesting machine of claim 17, wherein the draper belt control system comprises:

position identification logic configured to determine a position of the agricultural harvesting machine within the agricultural field and generate a position output indicative of the determined position.

19. The agricultural harvesting machine of claim 18, wherein the draper belt control system comprises:

header distribution logic configured to receive the position output from the position identification logic and determine the first distribution and second distribution across the header at the determined position within the agricultural field based on received mapping data indicating unharvested and harvested crop locations within the agricultural field and machine data for the agricultural harvesting machine.

20. The agricultural harvesting machine of claim 19, wherein the draper belt control system comprises:

a crop distribution sensor configured to sense the first distribution and the second distribution.

* * * * *